(12) United States Patent
Williamson et al.

(10) Patent No.: US 6,771,817 B1
(45) Date of Patent: Aug. 3, 2004

(54) METHOD AND SYSTEM FOR EXTENDING INK WORD DATA STRUCTURES WHILE MAINTAINING VERSION COMPATIBILITY

(75) Inventors: Peter H. Williamson, Kirkland, WA (US); Charlton E. Lui, Redmond, WA (US); Dan W. Altman, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 371 days.

(21) Appl. No.: 09/643,997

(22) Filed: Aug. 22, 2000

(51) Int. Cl.$^7$ ................................................. G06K 9/00
(52) U.S. Cl. ......................... 382/186; 382/187; 382/229
(58) Field of Search ................................. 382/187, 188, 382/189, 229, 186; 707/104.1

(56) References Cited

U.S. PATENT DOCUMENTS

| | | | |
|---|---|---|---|
| 5,594,640 A | | 1/1997 | Capps et al. |
| 5,615,285 A | * | 3/1997 | Beernink .................... 382/189 |
| 5,675,665 A | * | 10/1997 | Lyon ........................... 382/229 |
| 5,682,439 A | | 10/1997 | Beernink et al. |
| 5,710,916 A | | 1/1998 | Barbara et al. |
| 5,764,799 A | | 6/1998 | Hong et al. |
| 5,812,697 A | | 9/1998 | Sakai et al. |
| 5,828,991 A | | 10/1998 | Skiena et al. |
| 5,855,000 A | | 12/1998 | Waibel et al. |
| 5,857,099 A | | 1/1999 | Mitchell et al. |
| 5,953,451 A | | 9/1999 | Syeda-Mahmood |
| 5,960,447 A | | 9/1999 | Holt et al. |
| 5,995,664 A | * | 11/1999 | Shimomura .................. 382/229 |
| 6,005,973 A | | 12/1999 | Seybold et al. |
| 6,014,460 A | | 1/2000 | Fukushima et al. |
| 6,041,141 A | | 3/2000 | Yamamoto et al. |
| 6,111,985 A | * | 8/2000 | Hullender et al. .......... 382/229 |
| 6,473,517 B1 | | 10/2002 | Tyan et al. |
| 6,493,464 B1 | | 12/2002 | Hawkins et al. |
| 2002/0013795 A1 | * | 1/2002 | Dresevie et al. ............ 707/541 |
| 2002/0049796 A1 | * | 4/2002 | Dresevic et al. ............ 707/541 |

FOREIGN PATENT DOCUMENTS

JP            07110845          4/1995

OTHER PUBLICATIONS

Morita et al. "A Fast and Compact Data Structure of Storing Multi–Attribute Relations Among Words." IEEE Int. Conf. on Systems, Man and Cybernetics, vol. 3, Oct. 11, 1998, pp. 2791–2796.*

Carrano. "Data Abstraction and Problem Solving with C++: Walls and Mirrors." the Benjamin/Cummings Publishing Company, Inc., 1995, pp. 150–163, 175–176 and 179–180.*

Zhao et al. "New Method for Segmenting Unconstrained Handwritten Numeral String," Proc. Of the 4$^{th}$ Int. Conf on Document Analysis and Recognition, vol. 2, Aug. 18, 1997, pp. 524–527.

(List continued on next page.)

*Primary Examiner*—Jon Chang
(74) *Attorney, Agent, or Firm*—Law Offices of Albert S. Michalik, PLLC

(57) ABSTRACT

In a computing device that receives handwritten data, a method and data structure that enables extended data to be added to an existing ink word data structure without compromising backwards-compatibility. A flag in the header data structure is indicates to new ink processing programs the presence or absence of the extended data, and the size information maintained in the header is adjusted ensure that earlier versions of ink programs do not lose the extended data. The extended data is then added by including it in a copy of the existing ink word data structure, along with a tail structure that includes information describing the extended data and the tail structure to the new ink code, e.g., version and offset information. The tail structure can be used to locate a list of alternate word choices for an ink word that are maintained within the extended data.

43 Claims, 8 Drawing Sheets

OTHER PUBLICATIONS

Senda et al. "Document Image Retrieval System Using Character Candidates Generated by Character Regognition Process." Proc. Of the $2^{nd}$ Int. Conf. on Document Analysis and Recognition, Oct. 20, 1993, pp. 541–546.

Ariki et al. "Segmentation and Recognition of Handwritten Characters Using Subspace Method." Proc. of the $3^{rd}$ Int. Conf. on Document Analysis and Recognition, vol. 1, Aug. 14, 1995, pp 120–123.

Arica et al. "A New Scheme for Off–Line Handwritten Connected Digit Recognition." Proc. KES '98, $2^{nd}$ Int. Conf. on Knowledge–Based Intelligent Electronic Systems, vol. 2, Apr. 21, 1998, pp. 329–335.

Jung et al. Machine Printed Character Segmentation Method Using Side Profiles. Proc. SMC '99, IEE Int. Conf. on Systems, Man, and Cybernetics, vol. 6, Oct. 12, 1999, pp. 863–867.

Liang et al. "Efficient Algorithms for Segmentation and Recognition of Printed Characters in Document Processing." IEEE Pacific Rim Conf. on Communications, Computers and Signal Processing, vol. 1, May 19, 1993, pp. 240–243.

Lee et al. "A New Methodology for Gray–Scale Character Segmentation and Recognition." Proc. Of the $3^{rd}$ Int. Conf. on Document Analysis and Recognition, vol. 1, Aug. 14, 1995, pp. 524–527.

* cited by examiner

METHOD AND SYSTEM FOR EXTENDING INK WORD DATA STRUCTURES WHILE MAINTAINING VERSION COMPATIBILITY

FIELD OF THE INVENTION

The present invention relates generally to computer devices, and more particularly computer devices arranged to receive handwritten input.

BACKGROUND OF THE INVENTION

Contemporary computing devices allow users to enter handwritten words (e.g., in cursive handwriting and/or printed handwritten characters) and symbols (e.g., a character in Far East languages). The words and symbols can be used as is, e.g., to function as readable notes and so forth, or can be converted to text for more conventional computer uses. To convert to text, for example, as a user writes strokes representing words or other symbols onto a touch-sensitive computer screen or the like, a handwriting recognizer (e.g., trained with millions of samples, employing a dictionary, context and other rules) is able to convert the handwriting data into dictionary words or symbols. In this manner, users are able to enter textual data without necessarily needing a keyboard.

Ink processing technology uses various data structures to maintain the ink and text entered by a user. For example, one type of data structure includes information in a header and an ink data field that describe the ink (e.g., in coordinates) entered by a user. However, it may be desirable to store additional information in association with an ink word. At the same time, developing a new data structure type to store this information, or adding data to existing data structure types, would cause existing ink programs to fail.

SUMMARY OF THE INVENTION

Briefly, the present invention provides a tail structure that enables data to be added to an existing ink word data structure without compromising backwards-compatibility. A previously unused bit in the header data structure is used to indicate to new ink processing programs the existence of extended (supplemental/additional) data, and the size information maintained in the header is adjusted ensure that earlier versions of ink programs do not lose the extended data. Extended data is then added, e.g., effectively appended to a copy of the existing ink word data structure, along with a tail structure that includes information that describes the extended data and the tail structure to the new ink code. For example, the tail structure can include offset and/or other information, along with a version number that provides for future modifications.

In this manner, the tail structure can, for example, include offset information that locates a list of alternate word choices (and possibly other information) effectively appended to the ink word data structure, and another offset that points out a selected one of the alternates. The tail structure also includes information from which the length of the additional data may be determined or derived, so that the additional data and the tail structure (which is fixed in size relative to each version) may be discarded when no longer needed, thereby reclaiming storage space. For example, the size of the appended information may be derived from the offset information in the tail structure used in conjunction with the total size of the data structure (maintained in the header).

Other advantages will become apparent from the following detailed description when taken in conjunction with the drawings, in which:

DETAILED DESCRIPTION

Exemplary Operating Environment

Figure 1:
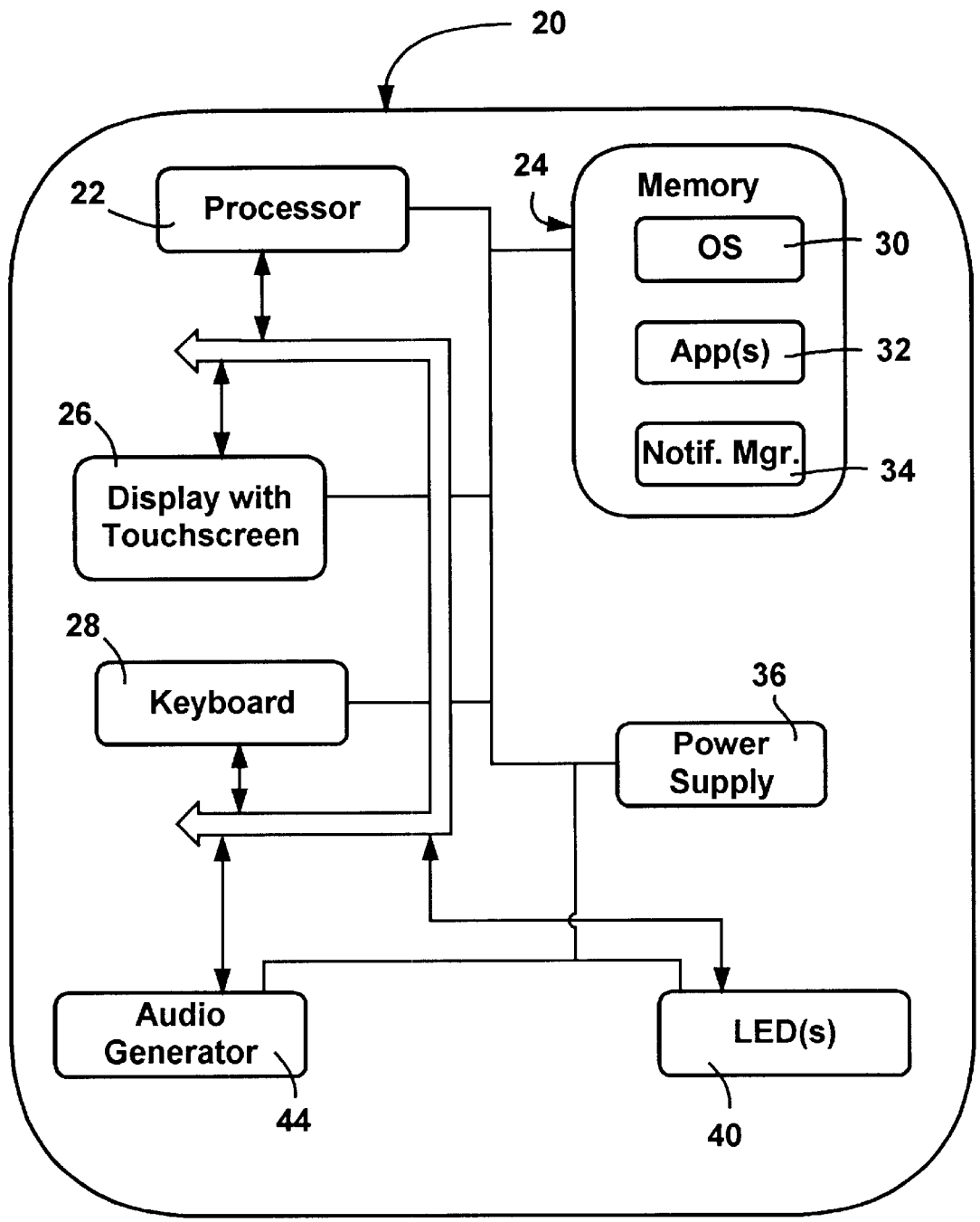
FIG. 1 is a block diagram representing one exemplary computer system into which the present invention may be incorporated.

FIG. 1 illustrates an example of a suitable operating environment 20 in which the invention may be implemented. The operating environment 20 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include routines, programs, objects, components, data structures and so forth that perform particular tasks or implement particular abstract data types. Typically the functionality of the program modules may be combined or distributed as desired in various embodiments.

Computing device 20 typically includes at least some form of computer readable media. Computer-readable media can be any available media that can be accessed by the computing device 20. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 20. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

FIG. 1 shows functional components of one such handheld computing device 20, including a processor 22, a memory 24, a display 26, and a keyboard 28 (which may be a physical or virtual keyboard). The memory 24 generally includes both volatile memory (e.g., RAM) and non-volatile memory (e.g., ROM, PCMCIA cards, and so forth). An operating system 30 is resident in the memory 24 and executes on the processor 22. The handheld personal computer 20 includes an operating system, such as the Windows® CE operating system from Microsoft® Corporation or other operating system.

One or more application programs 32 are loaded into memory 24 and run on the operating system 30. Examples of applications include email programs, scheduling programs, PIM (personal information management) programs, word processing programs, spreadsheet programs, Internet browser programs, and so forth. The handheld personal computer 20 may also include a notification manager 34 loaded in the memory 24, which executes on the processor 22. The notification manager 34 handles notification requests, e.g., from the application programs 32.

The handheld personal computer 20 has a power supply 36, which is implemented as one or more batteries. The power supply 36 may further include an external power source that overrides or recharges the built-in batteries, such as an AC adapter or a powered docking cradle.

The exemplary handheld personal computer 20 represented in FIG. 1 is shown with three types of external notification mechanisms: one or more light emitting diodes (LEDs) 40 and an audio generator 44. These devices may be directly coupled to the power supply 36 so that when activated, they remain on for a duration dictated by a notification mechanism even though the handheld personal computer processor 22 and other components might shut down to conserve battery power. The LED 40 preferably remains on indefinitely until the user takes action. Note that contemporary versions of the audio generator 44 use too much power for today's handheld personal computer batteries, and so it is configured to turn off when the rest of the system does or at some finite duration after activation.

Maintaining Alternates

Figure 2:
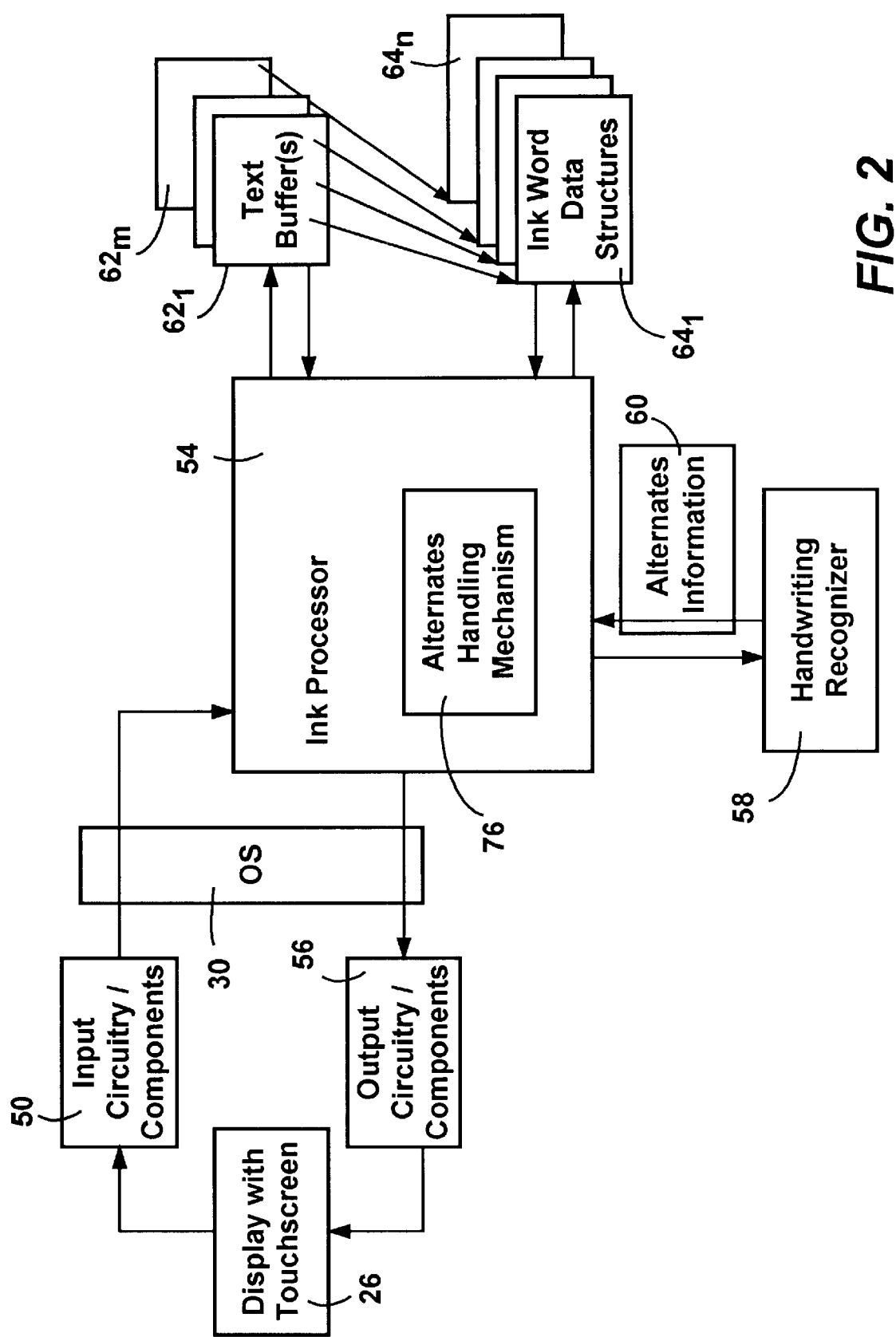
FIG. 2 is a block diagram generally representing components and data structures for handling electronic ink handwritten into a computer system and capable of implementing the present invention.

FIG. 2 represents general components and data structures of the computing system 20 when configured for handwriting recognition in accordance with one aspect of the present invention. In FIG. 2, as a user enters data such as by typing or by handwriting data on the touch screen display 26, input circuitry and/or other components 50 pass the information to the operating system 30. Depending on the state of the system and/or where the screen is contacted, the user input may be converted to text by the operating system or treated as. handwritten data. For example, when the screen has a representation of a keyboard displayed thereon and that keyboard is touched, the coordinates may be converted to an ASCII or Unicode character, or an editing command, and sent to an appropriate component (e.g. word processor) to use. Alternatively, if the user is writing in a handwriting input area, the input circuitry 50/operating system 32 passes the data to an ink processor component 54 to process and otherwise handle the electronic ink data. Note that a user may enter the handwritten data (electronic ink) in another manner, such as via a tablet connected to a personal computer.

As is understood, the handwritten data may be in the form of coordinates, and may include other information, e.g., pressure data, timing data and so forth. The ink processor component 54 may comprise an application program, or alternatively may be a subcomponent of or integrated into the operating system 30. The ink processor 54 may also be arranged to pass characters, (e.g., Unicode), whether typed or recognized from words or symbols, to conventional applications that can only deal with characters. For purposes of the present description, the ink processing component 54 will also perform the operations of a conventional word processor, e.g., handle both recognized text and unrecognized ink, allow the editing of words, both text words and handwritten words, update the display 26 (e.g., to word-wrap, mark or insert text or words, delete words) as appropriate, and so forth.

After some pre-processing, such as described in related copending U.S. Patent Application entitled: "Method and System of Matching Ink Processor and Recognizer Word Breaks," U.S. patent application Ser. No. 09/643,417 filed concurrently herewith and hereby incorporated by reference, the ink processor 54 passes ink data (e.g., one line as entered by a user) corresponding to words or symbols to a recognizer 58 for recognition thereof. The ink processor 54 may also provide ink feature information. Depending on factors such as the system's processing speed and processor/memory availability and so forth, and/or a user's explicit request for recognition, the data passing and/or recognition may take place in the background or foreground, as appropriate. In keeping with the present invention as described below, the recognizer 58 returns alternates information 60 corresponding to recognized word or words for the ink passed thereto. In general, the alternates information 60 comprises a list of alternate word choices, or simply alternates (sometimes referred to as candidates), for each word recognized by the recognizer 58 for a given set of handwriting data passed thereto. The alternates may be ranked in accordance with probability of correctness, and/or probability information associated with each alternate may be returned in the alternates information 60. For example, a list of alternates may be returned with a highest ranked alternate having a sixty percent probability, the next ranked alternate with a ten percent probability, and so on. The number of returned alternates may be limited to some fixed amount, and/or alternates with very low probabilities may be left off the list. Note that the probability information may be returned on a logarithmic scale instead of in terms of a percentage value. One suitable recognizer is described in U.S. Pat. Nos. 5,313,527 and 5,467,407, hereby incorporated by reference. However, as will be understood, the present invention will operate with any type of recognizer that returns alternates, including a speech recognizer.

As generally represented in FIG. 2, the ink processor 54 maintains one or more text buffers $62_1$–$62_m$. Each text buffer (e.g. $62_1$) is a data structure storing some or all of the contents of a document, such as individual letters, spaces, inked words, and drawings. For example, a text buffer can store the entire contents of a document, or each of a plurality of text buffers can represent one paragraph in a document.

To indicate an inked word, the text buffer (e.g., $62_1$) also contains special codes that indicate the locations of ink words $64_1$–$64_n$ relative to text and other items in the text buffer $62_1$. Each such code is directly followed by a pointer (shown in FIG. 2 via the slanted lines from the text buffers) to the ink word data structure (sometimes referred to as a scrawl) that contains the ink data for that word.

Figure 3:
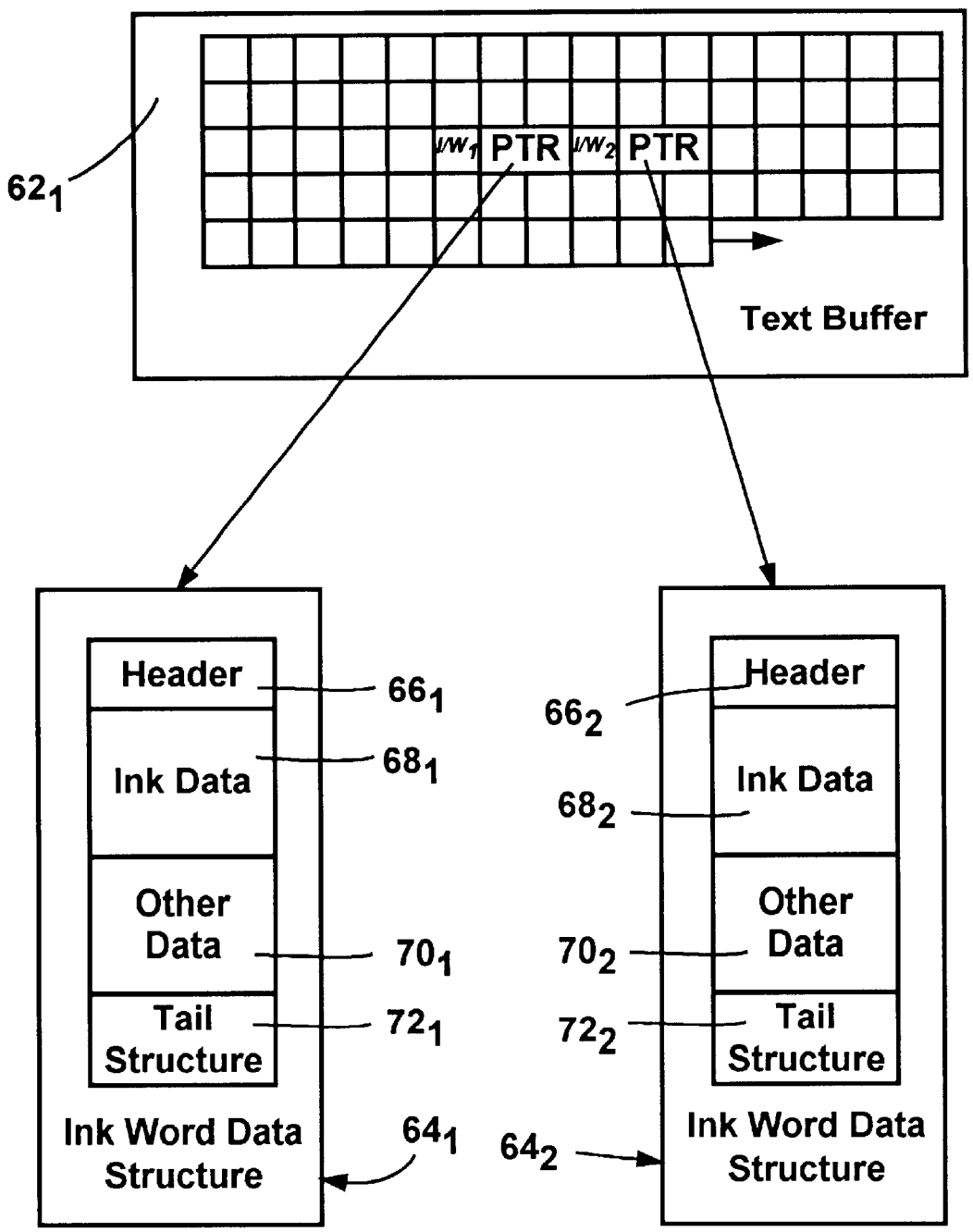
FIG. 3 is a representation of how handwritten data and text data is generally maintained by the ink processor.
Figure 4:
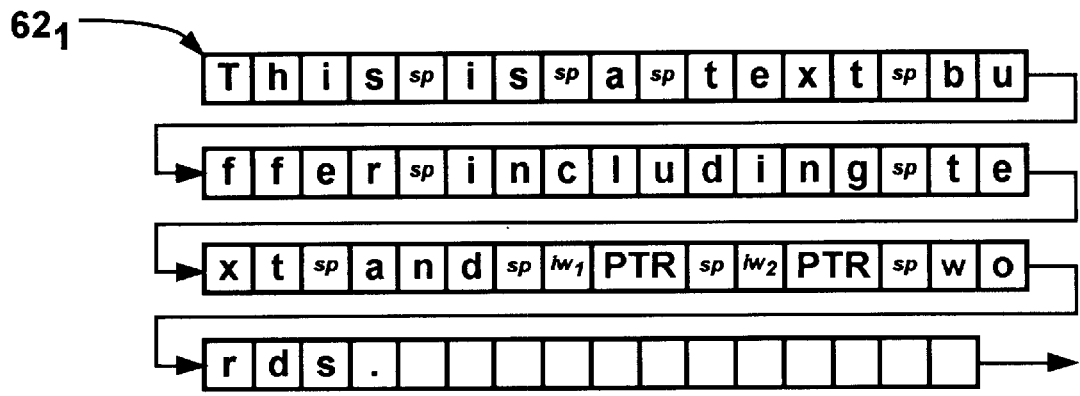
FIG. 4 is a representation of the contents of an example text buffer and how it is displayed to a user.
Figure 4:
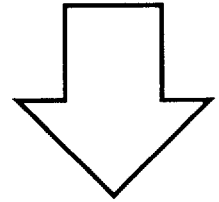
Figure 4:
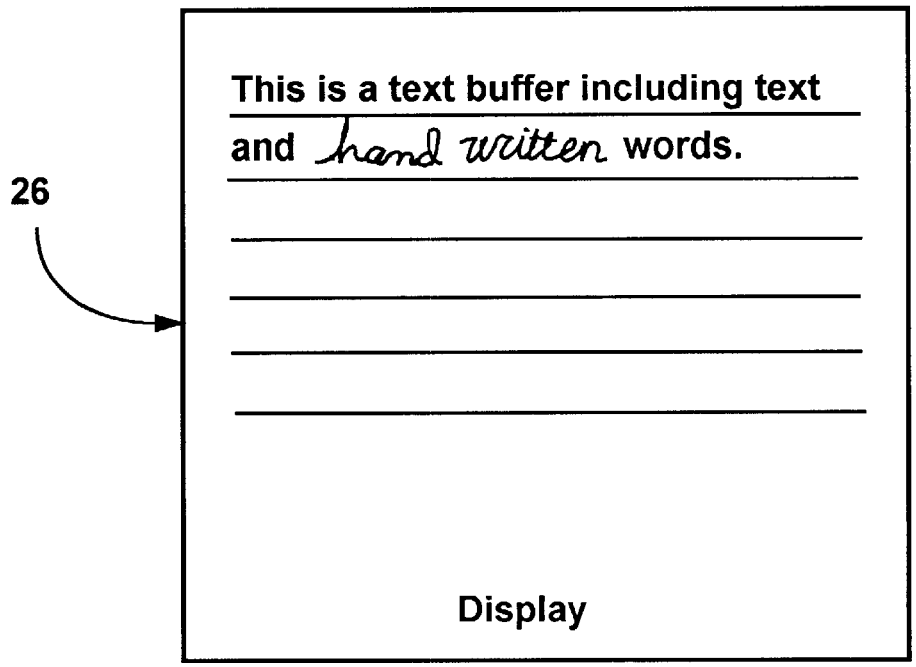

By way of example, FIG. 3 represents a text buffer (e.g., $62_1$) with memory (e.g., bytes) for text, possibly other items, and special ink word codes ($IW_1$ and $IW_2$), each code followed by its respective pointer to ink words $64_1$–$64_2$. As shown in FIG. 3, the pointers are two bytes in length, but of course pointers of other sizes are feasible. Also, only two ink words are shown, and are consecutive in the text buffer, however any number of ink words may be placed anywhere in a document/text buffer. FIG. 4 shows how the text buffer $62_1$ (shown in FIG. 4 as a linear array) and its ink word data structures $64_1$–$64_2$ may be interpreted by the ink processor to result in a particular display, having been converted to their text form.

As generally represented in FIG. 3, each ink word, such as the ink word $64_1$, comprises a data structure having a header 66 which describes the ink data section 68 following it. One of the things tracked in the header 66 is whether an ink word has alternates (i.e., the ink was sent to the recognizer with the alternates information returned therefore) in a Recognized (tsRecognized) flag.

In accordance with one aspect of the present invention, in addition to the header field 66 and ink data field 68, other fields are possible, such as an other data field 70 followed by a tail structure field 72 that describes the other field 70. For example, the other field may include the alternates and probability information associated with those alternates as returned by the recognizer 58 following recognition. As described below, the tail structure field 72 describes this other field 70. The maintenance and use of the alternates, and the tail structure, are described below and further described in related copending U.S. patent applications Ser. No. 09/644,002 entitled "Method and System for Handling the Selection of Alternates for Recognized Words"; Ser. No. 09/643,414 entitled "Method and System for Maintaining Alternates in Association with Recognized Words" and Ser. No. 09/643,617 entitled "Method and System for Searching for Words in Ink Word Documents, " filed concurrently herewith and hereby incorporated by reference.

The following table sets forth an ink word data structure (scrawl) including the tail structure, (also described below with reference to FIG. 6):

```
// The Ink Word Structure
typedef struct TXT_SCRAWL
{
    U8          flags;
    U8          candidateChoice;    //index of chosen candidate
                                    //zero based
    INK_STYLE   inkStyle;
    COORD16     width;
    U16         strokeCount;
    U16         bufferSize;
    U8          buffer[2]; //padded for alignment
    // first comes the array of strokes
    //then comes a double null terminated list of strings
    //at the very end is a TXT_SCRAWL_TAIL struct
} TXT_SCRAWL, FAR * P_TEXT_SCRAWL;
// this buffer is appended onto the scrawl to optimize
// getting to strings. For compatibility reasons, it grows
// from the beginning, not the end of the tail structure,
// since a negative addressing scheme from the text scrawl
// end is used to get to its members
typedef struct TXT_SCRAWL_TAIL
{
    U32         tailStructVersion;  //starts at 1 and grows
                                    //upwards;
    U32         stringAreaOffset;   //offset from beginning
                                    //of TXT_SCRAWL to the
                                    //start of the double
                                    //null terminated string
                                    //list.
    U32         chosenStringOffset; //offset from beginning
                                    //of TXT_SCRAWL to the
                                    //chosen string.
    U16         wchFirstXlateChar;  //first char of the
                                    //chosen string.
    // ADD ANY NEW MEMBERS AT THE END
} TXT_SCRAWL_TAIL * P_TEXT_SCRAWL_TAIL;
```

For purposes of simplicity herein, the present invention will primarily be described with respect to handwritten cursive words, using the English language for various examples. However, as will be understood, the present invention may operate with printed characters and symbols, and provides numerous benefits regardless of any particular language.

One of the operations performed by the ink word processor 54 is to manage the alternates returned by the recognizer 58. To this end, as generally represented in FIG. 2, the ink processor 54 includes code that serves as an alternates handling mechanism 76. In accordance with one aspect of the present invention, in one preferred embodiment, following recognition of a word, the alternates handling mechanism 76 maintains the alternates data in an ink word data structure (e.g., $64_1$) of the text buffer e.g., $62_1$, such as in the other field $70_1$, as described by the tail structure field $72_1$. Once a word has an alternate selected for it, the ink word data structure is displayed as the first letter of the selected alternate, with any remaining letters being inserted as text into the text buffer.

Figure 5:
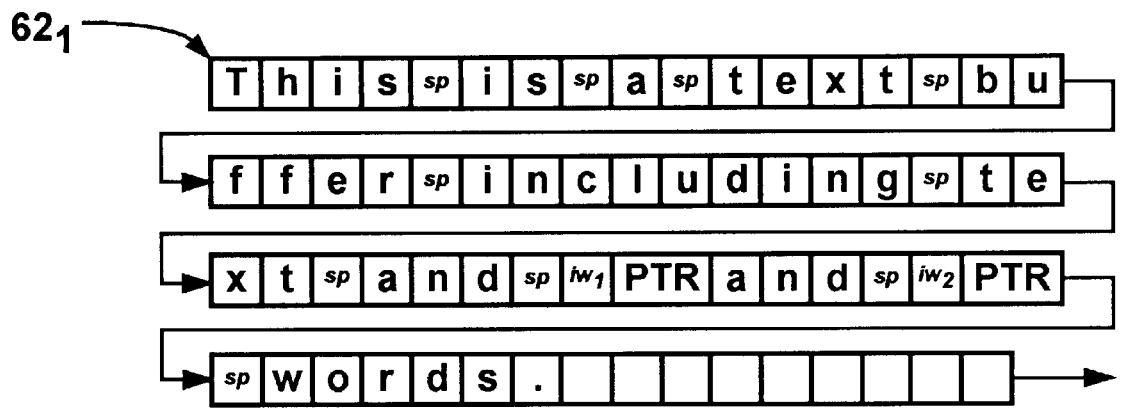
FIG. 5 is a representation of the contents of the example text buffer of FIG. 4 as modified once an ink word has been converted to text.
Figure 5:
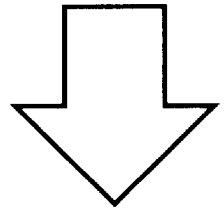
Figure 5:
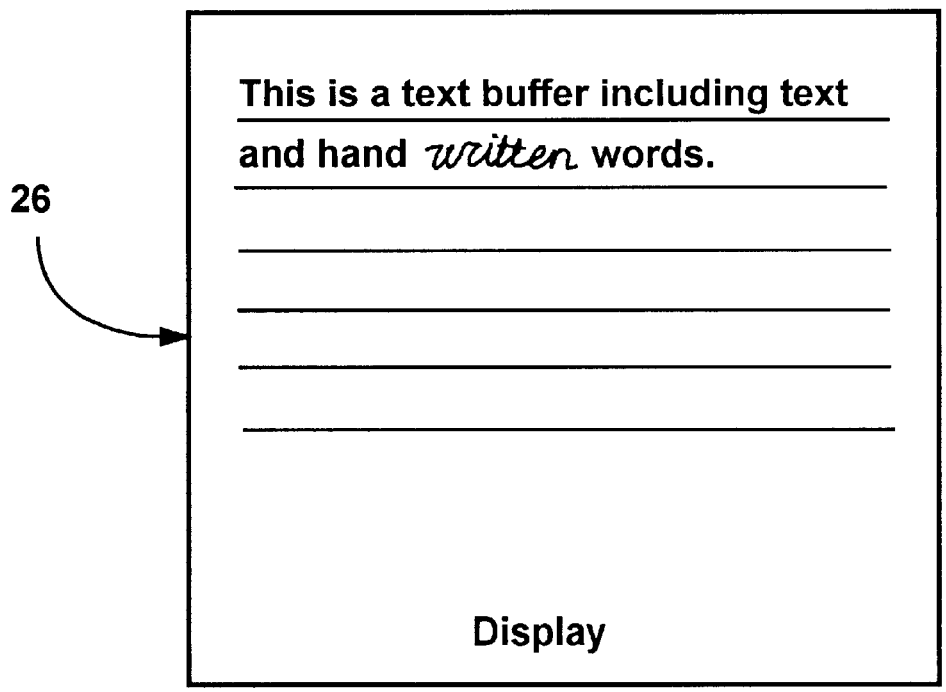
Figure 6:
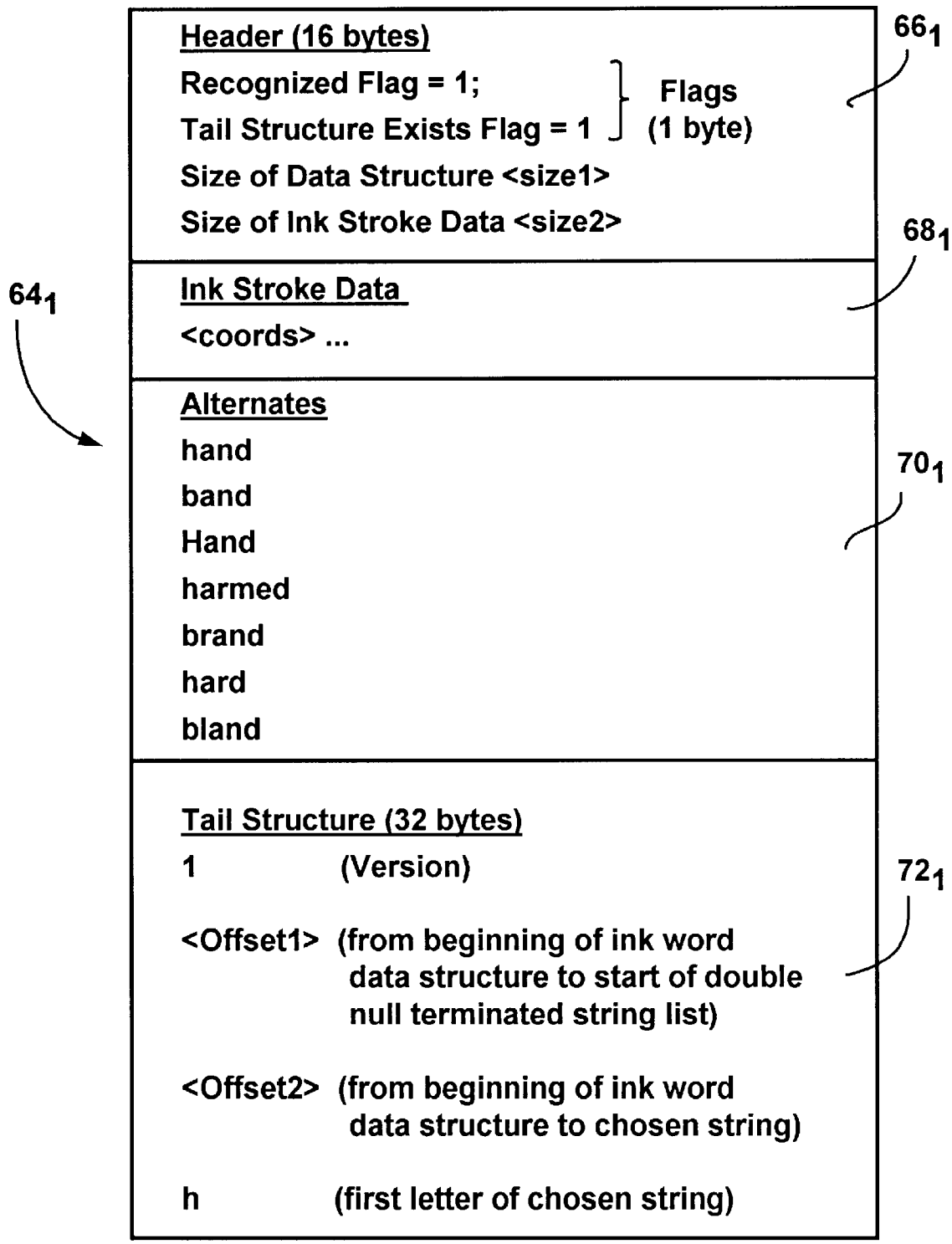
FIG. 6 is a representation of an ink word data structure once the alternates have been returned by a recognizer for an ink word, including a tail structure in accordance with one aspect of the present invention.

FIGS. 4 and 5 shows how this is accomplished by manipulating the text buffer $62_1$, while FIG. 6 shows how the information is added to the ink word data structure $64_1$ in accordance with one aspect of the present invention. As shown in FIG. 4, prior to recognition by the recognizer 58, the ink word is treated as one unitary word (e.g., the handwritten word "hand" ) for purposes of ink processing. In other words, the user moves the word around as a unit, deletes it as a unit, and cannot insert text in between the letters (although it is feasible to allow such an ink word to be split by the user, such as by converting the single ink word data structure into two ink word data structures each having part of the stroke data of the original ink word data structure therein). However, once the word has been recognized and the user has selected an alternate for it, (or possibly has the device set up to automatically select an alternate), the text buffer $62_1$ and data structure $64_1$ are changed as shown in FIGS. 5 and 6, respectively.

In FIG. 5, the text "hand" has been selected as the alternate for the handwritten data ("hand" as written out in FIG. 4). As represented in FIG. 5, upon user selection of "hand" as the selected text word, the letters following the first letter, "and" are inserted into the text buffer $62_1$. The ink word (IW1) remains the same from the perspective of most of the code that deals with the text buffers, for example, the editing code. However, the alternates handling mechanism 76 changes the ink word data structure $64_1$, whereby the ink processor 54 displays the ink word data structure $64_1$ differently so as to produce the correct output for display purposes, i.e., only as a first, single text letter of the word. This enables the editing code to edit the individual characters of the word in the text buffer, without having to modify the code base to enable editing within the ink word data structure. At the same time, the stroke data and alternates information is preserved with what is serving as the first letter of the selected word.

To correctly interpret the ink word data structure, as represented in FIG. 6, the alternates handling mechanism 76 works with flags in the header $66_1$ of the ink word data structure $64_1$, the aforementioned Recognized flag which indicates whether the word has had alternates returned therefor, and a Show Recognized flag (tsShowRecognized) which indicates whether the user has converted the ink to text. Note that the Show Recognized flag is set when the user has converted to text, e.g., via a Recognize command, as generally described in the aforementioned U.S. Patent Application entitled: "Method and System of Handling the Selection of Alternates for Recognized Words." A Tail Structure Exists (tsTailStructureExists) flag indicates whether the tail structure is present in an ink word data structure. Note that for now, the Tail Structure Exists flag has the same value as the Recognized flag, however, these flags are actually two separate flags, which at present are both set at the same time, and both cleared at the same time. The Tail Structure Exists flag is provided for the future, wherein other information may be stored in the ink word (as described in the tail structure), and it is possible to have a tail structure with no alternates.

The ink processor 54 uses these flags to determine whether it needs to contact the recognizer 58 to obtain alternate information, and also to determine whether to display the ink word as ink or as a text letter. When the word has been recognized by the recognizer, i.e., has had the alternates information 60 returned for it, the alternates and the tail structure are essentially appended to the ink word data structure $64_1$ (actually copied to a copy thereof). If the word is to be displayed as text, (e.g., the ink has been converted to text and the Show Recognized flag equals one), only the first character ("h" in the present example, stored in the tail structure $72_1$) of the word is displayed. As represented in FIG. 5, the succeeding letters of the word ("and" in the present example using the word "hand") are inserted into the text buffer as ordinary text immediately following the ink word.

In accordance with one aspect of the present invention, the tail structure describes the alternate information added to the ink word data structure $64_1$, and also factors in its own data in the total size description. In general, the tail structure comprises a version code (one in the present example), two offsets, and the first letter of the chosen string. The two offsets are zero-based and indicate where in the data structure the alternate information (double null terminated string list) begins, and where in the data structure the chosen string information begins. As can be readily appreciated, it is straightforward to determine where the alternates information begins from these offsets, and because the tail structure size is known (thirty-two bytes in version one) as long as the version number can be located, which can be accomplished by leaving the version number a certain number of bytes from the end. Note that when the alternates/tail structure is copied to a new ink word data structure, the size of the data structure in the header is modified to include this data. The computing of the tail structure and the copying of the information are described below with reference to FIGS. 7 and 8.

Note that instead of directly including the alternate information/tail structure in (a copy of) the ink word data structure, the information can be indirectly included, e.g., by storing a pointer to another data structure that includes the alternates information/tail structure. The length of the ink word data structure can be increased, (e.g., by the size in bytes of the pointer), and when the tail structure exists flag is set, the ink processor 54 knows that the pointer is at the end of the ink word data structure. Such a pointer will move with the ink word.

As can be readily understood, it is straightforward to maintain the probability information with the alternates, which are null delimited. For example, each string can have exactly n bytes before or after it after it (but before the zero delimiter) that store the probability data for that string. Also, another delimiter could be used to separate probability data from the string data, e.g., the string followed by a null followed by the data followed by a null makes up one string choice, probability data pair. Alternatively, the tail structure could be expanded to separately describe a probability field.

Thus, in the example shown in FIGS. 4–6, once recognized and converted to text, the ink word storing the data for "hand" will be converted to an ink word that when displayed will appear as the letter "h" followed by the text letters "and" in the text buffer. In this manner, the ink data and alternates are preserved with the word, e.g., as the word is moved around during word processing operations. Also, the user can individually edit the characters in the word.

Because the ink data and alternates are essentially stored with the first letter of a word, if a user deletes that letter, then the ink data is lost. This is not usually significant, as the recognizer generally tends to get the first letter correct. In an alternative implementation, this information can remain with another letter that is not deleted. For example, instead of actually deleting the first letter (as represented in the ink word data structure) from the text buffer when the user requests deletion, the second letter can instead be deleted, and the ink word data structure changed (the field that stores the first letter of the chosen string, "h" in FIG. 6), to display the second letter instead of the first. This can be repeated until the entire word is deleted, and even then, the ink word can be buffered, e.g., for an undo operation. Note that there is no reason that that an edited word has to correspond to one of the alternates, or even begin with the same letter as one of the alternates.

Lastly, the ink word data structure can be modified to lose the alternates information and tail structure if no longer needed, yet remain as an ink word. For example, once a user has selected a word and saved the document, it may still be desirable to maintain the ink data, but not the alternates. In such an event, the size of the data structure in the header field is reduced based on the alternates' offset information stored in the tail structure, and the memory reclaimed.

Figure 7:
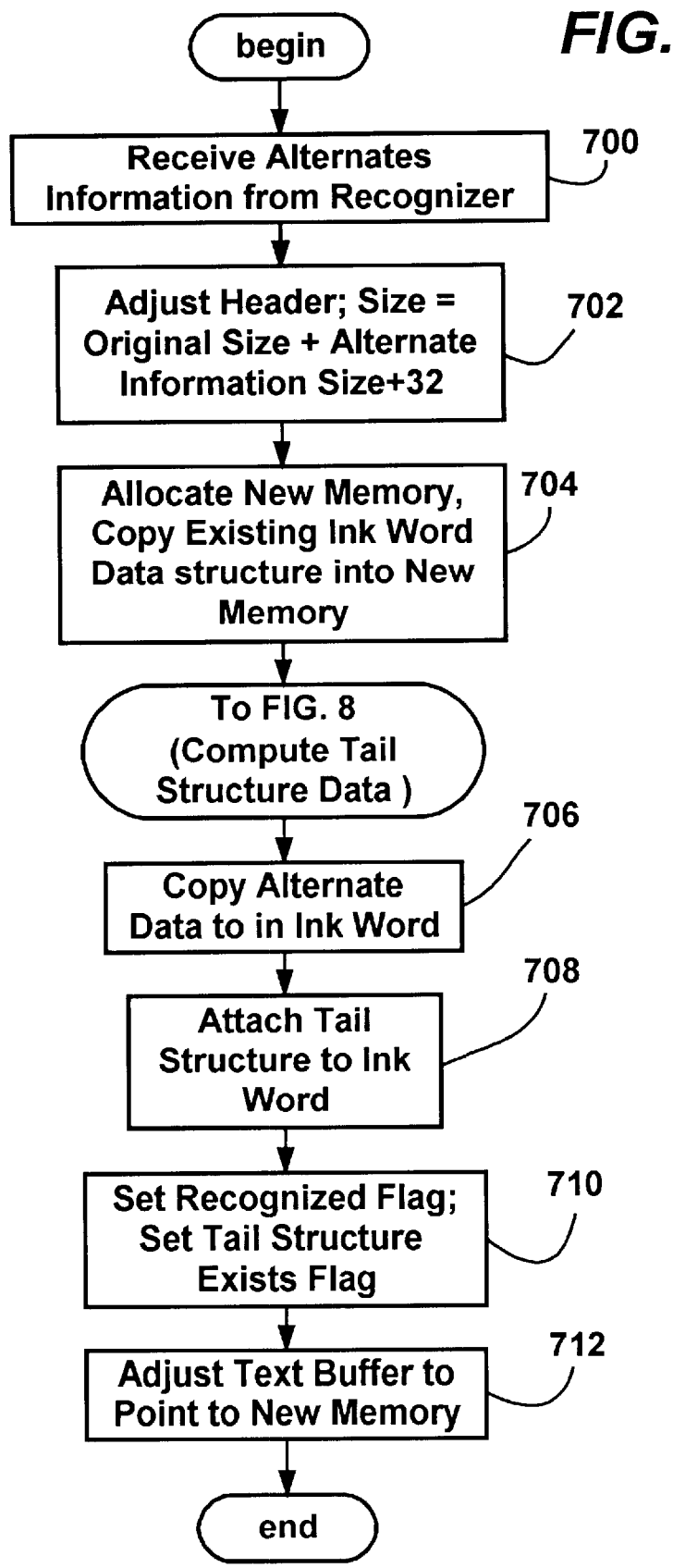
FIG. 7 is a flow diagram generally describing actions taken when alternates are received from a recognizer by the ink processor including computing and effectively appending a tail structure in accordance with one aspect of the present invention.
Figure 8:
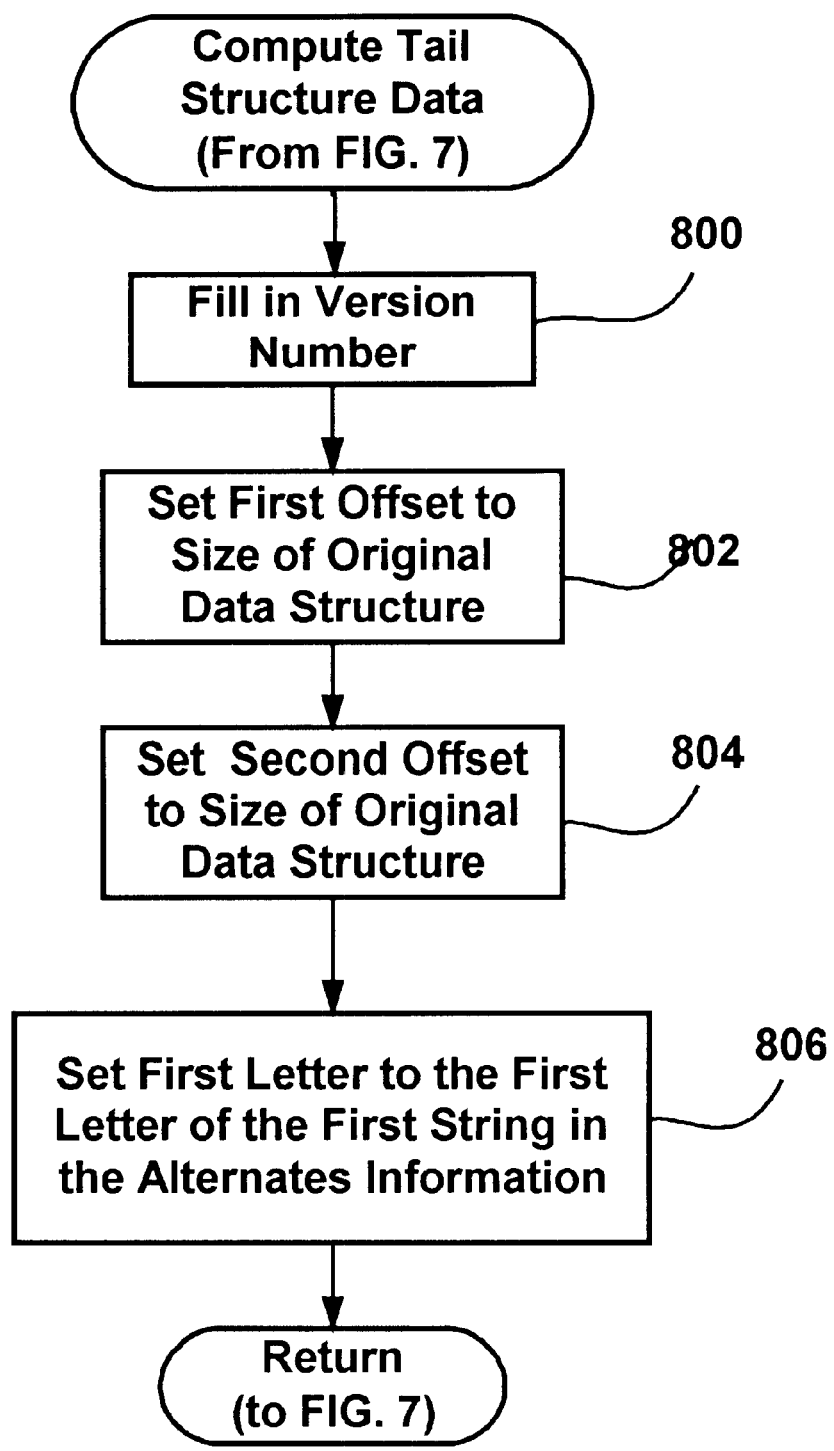
FIG. 8 is a flow diagram generally describing one way in which the data stored in a tail structure may be computed in accordance with one aspect of the present invention.

To summarize by way of an explanation of the operation of the present invention, FIGS. 7 and 8 describe how the ink processor 54 handles alternates following recognition (FIG. 7), including computing the text buffer (FIG. 8). Note that FIGS. 7 and 8 are simplified and only one way to manage the alternates, and that some of the steps of FIGS. 7 and 8 need not be in any particular order.

FIG. 7 begins when the word has been recognized by the recognizer 58, i.e., the alternates information 60 has been returned for at least this word as represented by step 700. Note that if the user is requesting alternates for a word that has not yet had alternates returned for it, (i.e., the Recognized flag is not set), the ink processor can first request recognition. At step 702, the header of the ink word data structure is adjusted, e.g., its size field is increased to account for the size of the alternates data and tail structure, described below. At step 704, new memory of this size is allocated and the existing ink word data structure (header and ink data) is copied into the new memory, which will become the new ink word data structure. As described below with reference to FIG. 8, the various data for the tail structure (e.g., the offsets and sizes) are computed from the existing ink word data structure and the returned alternates information 60.

FIG. 8 describes how the tail structure can be computed and built in the newly allocated memory, beginning at step 800 wherein an appropriate version number known to the ink processor 54 is filled in. Then, at step 802, the first offset, Offset1 in FIG. 6, is set to the size of the original data structure to indicate where the alternates data begins. Similarly, at step 804, the second offset, Offset2 in FIG. 6, is set to the size of the original data structure to indicate where the selected alternate string data begins, which thus defaults the ink word data structure to the first (most likely) alternative. Then the first letter of this string is written to the first letter field.

Returning to FIG. 7, at steps 706 and 708, the alternates and tail structure are copied (directly into new memory, or indirectly via a pointer) to the newly allocated ink word data structure, and at step 710 the Recognized flag and Tail Structure Exists flag is appropriately set (e.g., to one, to indicate the alternates and the presence of the tail structure). Step 712 then represents changing the pointer in the text buffer to point to this new ink word data structure, and the memory of the old ink work data structure reclaimed. Note that because existing editing code moves ink word data structures by the total size, the alternates information and tail structure is not lost when moves ink word data structures are moved.

By way of example, to use the tail structure to locate alternates for a user, when a user requests a menu of alternates, the ink processor 54 first checks for the existence of the tail structure via the tail structure exists flag. If set, the address of the tail structure is determined by subtracting its size (e.g., thirty two bytes) from the total ink word data structure size. Then, the offset information and version information can be determined. Note that if the size changes according to a version number, then the version number may first need to be determined, e.g., by having it be a certain number of bytes from the end of the structure, regardless of the version. In any event, once the offset that points to the alternates data is known, the alternates can be accessed such as for displaying to the user on the menu.

When no longer needed, such as when a user manually closes a document, the ink word data structure can lose the alternates data and tail structure to reclaim memory. For example, this may be accomplished by allocating new memory, copying only the header and ink stroke data into the new memory, clearing the various flags in the new header, and changing the text buffer to point to the new ink word data structure instead of the old one. Another way is to replace the ink word data structure in the text buffer with the first letter of the selected alternate, and then reclaim the memory of the ink word data structure. This conversion loses the ink information, but saves a relatively large amount of memory.

As can be seen from the foregoing detailed description, there is provided a method and system that allows for the addition of additional information (such as alternates data) to a data structure in a manner that preserves the ability of existing code to use that data structure, i.e., does not break existing editing code. The method and system are efficient, robust and flexible, and extensible in allowing for future versions.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer system having recognized words, a method comprising:
   a) receiving a set of alternates for an ink word; and
   b) associating alternates data corresponding to the alternates with the ink word by:
      (i) including the alternates data in an ink word data structure that represents the ink word; and
      (ii) including a tail structure in the ink word data structure, the tail structure having information therein for locating the alternates data.

2. The method of claim 1 further comprising, changing the size of the data structure in a header field of the ink word data structure.

3. The method of claim 1 further comprising, modifying information in a header field of the ink word data structure to indicate that additional information is included therein.

4. The method of claim 1 wherein including the alternates data comprises, copying an existing ink word data structure to a new ink word data structure, and writing the alternates data into the new ink word data structure.

5. The method of claim 1 wherein including the tail structure comprises, copying an existing ink word data structure to a new ink word data structure, and writing the tail structure into the new ink word data structure.

6. The method of claim 1 further comprising, receiving a request for alternates data, accessing the tail structure to locate the alternates data, and providing at least part of the alternates data in response to the request.

7. The method of claim 1 wherein the tail structure maintains information corresponding to a location of a selected alternate of the set of alternates data.

8. The method of claim 7 further comprising, receiving a request related to the selected alternate data, accessing the tail structure to locate the selected alternate, and providing at least part of the selected alternate in response to the request.

9. The method of claim 1 wherein a selected alternate is selected from the set of alternates data, wherein the tail structure maintains a first character corresponding to the selected alternate, and further comprising, receiving a request corresponding to the first character of the selected alternate, accessing the tail structure to locate the character, and providing the character in response to the request.

10. A computer-readable medium having stored thereon a data structure, the data structure comprising:
    a header field including information indicating that extended data is included in the data structure;
    a first data field comprising a first set of data;
    a second data field comprising the extended data;
    a third data field including data describing the second data field, the data including information indicative of the location of the second field within the data structure; and
    wherein the header field includes a size field, the size field including the size of the header field, the first data field, the second data field and the third data field.

11. The computer readable medium of claim 10 wherein the first data field comprises data corresponding to ink handwritten by a user.

12. The computer readable medium of claim 11 wherein the second data field comprises a set of alternates information including text data corresponding to the ink handwritten by a user.

13. The computer readable medium of claim 11 wherein the second data field comprises a set of alternates information including text data and probability data corresponding to the ink handwritten by a user.

14. The computer readable medium of claim 10 wherein the information in the third data field indicative of the location of the second field within the data structure comprises an offset.

15. The computer readable medium of claim 10 wherein the third data field includes a version identifier.

16. The computer readable medium of claim 15 wherein the third data field has a fixed size relative to the version identifier.

17. The computer readable medium of claim 10 wherein the first data field comprises data corresponding to ink handwritten by a user, the second data field comprises a set of alternates information including text data corresponding to the ink handwritten by a user, and wherein the third data field includes data describing a selected alternate within the set of alternates.

18. The computer readable medium of claim 17 wherein the data in the third data field describing a selected alternate within the set of alternates comprises an offset.

19. The computer readable medium of claim 17 wherein the header data field includes information indicating a selection of the selected alternate.

20. The computer readable medium of claim 17 wherein the third data field includes text corresponding to a first character of the selected alternate.

21. A computer-readable medium having computer-executable instructions which when executed perform the method of claim 1.

22. A computer-readable medium having stored thereon a data structure, the data structure comprising:
   a header field including information indicating that extended data is included in the data structure;
   a first data field comprising data corresponding to handwritten ink;
   a second data field comprising the extended data;
   a third data field including data describing the second data field, the data including information indicative of the location of the second field within the data structure; and
   wherein the header and data fields are interpreted to provide data corresponding to the handwritten ink.

23. The computer readable medium of claim 22 wherein the header field includes a size field, the size field including the size of the header field, the first data field, the second data field, and the third data field.

24. The computer readable medium of claim 22 wherein the second data field comprises a set of alternates information including text data corresponding to the handwritten ink.

25. The computer readable medium of claim 22 wherein the second data field comprises a set of alternates information including text data and probability data corresponding to the handwritten ink.

26. The computer readable medium of claim 22 wherein the information in the third data field indicative of the location of the second field within the data structure comprises an offset.

27. The computer readable medium of claim 22 wherein the third data field includes a version identifier.

28. The computer readable medium of claim 27 wherein the third data field has a fixed size relative to the version identifier.

29. The computer readable medium of claim 22 wherein the second data field comprises a set of alternates information including text data corresponding to the handwritten ink, and wherein the third data field includes data describing a selected alternate within the set of alternates.

30. The computer readable medium of claim 29 wherein the data in the third data field describing a selected alternate within the set of alternates comprises an offset.

31. The computer readable medium of claim 29 wherein the header data field includes information indicating a selection of the selected alternate.

32. The computer readable medium of claim 29 wherein the third data field includes text corresponding to a first character of the selected alternate.

33. A computer-readable medium having stored thereon a data structure, the data structure comprising:
   a header field including information indicating that extended data is included in the data structure;
   a first data field comprising a first set of data;
   a second data field comprising the extended data; and
   a third data field including data describing the second data field, the data including an offset indicative of the location of the second field within the data structure, the third data field interpreted to determine a location of the second data field.

34. The computer readable medium of claim 33 wherein the header field includes a size field, the size field including the size of the header field, the first data field, the second data field and the third data field.

35. The computer readable medium of claim 33 wherein the first data field comprises data corresponding to ink handwritten by a user.

36. The computer readable medium of claim 35 wherein the second data field comprises a set of alternates information including text data corresponding to the ink handwritten by a user.

37. The computer readable medium of claim 35 wherein the second data field comprises a set of alternates information including text data and probability data corresponding to the ink handwritten by a user.

38. The computer readable medium of claim 33 wherein the third data field includes a version identifier.

39. The computer readable medium of claim 38 wherein the third data field has a fixed size relative to the version identifier.

40. The computer readable medium of claim 33 wherein the first data field comprises data corresponding to ink handwritten by a user, the second data field comprises a set of alternates information including text data corresponding to the ink handwritten by a user, and wherein the third data field includes data describing a selected alternate within the set of alternates.

41. The computer readable medium of claim 40 wherein the data in the third data field describing a selected alternate within the set of alternates comprises an offset.

42. The computer readable medium of claim 40 wherein the header data field includes information indicating a selection of the selected alternate.

43. The computer readable medium of claim 40 wherein the third data field includes text corresponding to a first character of the selected alternate.

* * * * *